US012583742B2

(12) United States Patent
Surma et al.

(10) Patent No.: US 12,583,742 B2
(45) Date of Patent: Mar. 24, 2026

(54) HYDROGEN PRODUCTION AND CARBON SEQUESTRATION VIA HIGH TEMPERATURE CRACKING OF NATURAL GAS IN AN INDUCTIVELY HEATED FLUIDIZED CARBON PARTICLE BED

(71) Applicant: InEnTec Inc., Richland, WA (US)

(72) Inventors: Jeffrey E. Surma, Richland, WA (US);
Daniel R. Cohn, Cambridge, MA (US);
Leslie Bromberg, Sharon, MA (US)

(73) Assignee: InEnTec Inc., Richland, WA (US)

( * ) Notice: Subject to any disclaimer, the term of this patent is extended or adjusted under 35 U.S.C. 154(b) by 708 days.

(21) Appl. No.: 17/907,340

(22) PCT Filed: Mar. 26, 2021

(86) PCT No.: PCT/US2021/024487
§ 371 (c)(1),
(2) Date: Sep. 26, 2022

(87) PCT Pub. No.: WO2021/195566
PCT Pub. Date: Sep. 30, 2021

(65) Prior Publication Data
US 2023/0159326 A1      May 25, 2023

Related U.S. Application Data

(60) Provisional application No. 63/000,913, filed on Mar. 27, 2020.

(51) Int. Cl.
*C01B 3/28*          (2026.01)
*B01J 8/18*          (2006.01)
*B01J 8/42*          (2006.01)

(52) U.S. Cl.
CPC .............. *C01B 3/28* (2013.01); *B01J 8/1827* (2013.01); *B01J 8/1836* (2013.01); *B01J 8/42* (2013.01);
(Continued)

(58) Field of Classification Search
None
See application file for complete search history.

(56) References Cited

U.S. PATENT DOCUMENTS

| | | | |
|---|---|---|---|
| 3,006,838 A | 10/1961 | Johnson | |
| 3,368,871 A | 2/1968 | Oconnor et al. | |
| (Continued) | | | |

FOREIGN PATENT DOCUMENTS

| | | |
|---|---|---|
| DE | 102019207967 A1 | 12/2020 |
| WO | 2010095025 A2 | 8/2010 |
| (Continued) | | |

OTHER PUBLICATIONS

"Examination Report for CA Appl. No. 3,177,381, mailed Apr. 2, 2025 pp. all pages".

(Continued)

*Primary Examiner* — John J Figueroa
(74) *Attorney, Agent, or Firm* — RAY QUINNEY & NEBEKER; Nathan M. Orme

(57) ABSTRACT

Embodiments of the invention relate to systems and methods for cracking hydrocarbons into hydrogen gas and carbon using heating of a fluidized bed. The systems and methods utilize electrically conductive carbon or graphite particles as a fluidized bed material for heating hydrocarbon feedstock to at least a pyrolysis temperature. The electrically conductive carbon, graphite, or other particles may be heated by electrically powered sources that include induction heating, microwave heating, millimeter wave heating, joule heating and/or plasma heating. Combustion heating may also be employed in varying amounts with varying combinations of electrically powered heating sources.

17 Claims, 5 Drawing Sheets

(52) U.S. Cl.
CPC ................... *B01J 2208/0038* (2013.01); *B01J 2208/00442* (2013.01); *C01B 2203/0272* (2013.01); *C01B 2203/0822* (2013.01); *C01B 2203/0855* (2013.01); *C01B 2203/0866* (2013.01); *C01B 2203/1241* (2013.01)

(56) References Cited

U.S. PATENT DOCUMENTS

| | | | | |
|---|---|---|---|---|
| 6,756,140 B1 * | 6/2004 | McAlister | .......... | F02M 63/0007 |
| | | | | 429/422 |
| 7,157,167 B1 * | 1/2007 | Muradov | ................... | C01B 3/28 |
| | | | | 429/492 |
| 7,588,746 B1 * | 9/2009 | Muradov | ............... | B01J 19/125 |
| | | | | 422/186.04 |
| 2004/0253168 A1 | 12/2004 | Chu | | |
| 2007/0012229 A1 | 1/2007 | Rehmat et al. | | |
| 2011/0064644 A1 * | 3/2011 | McAlister | ........... | H01M 8/0606 |
| | | | | 96/218 |
| 2011/0070510 A1 * | 3/2011 | McAlister | .............. | F24D 11/005 |
| | | | | 205/462 |
| 2014/0056799 A1 | 2/2014 | Gadkaree et al. | | |
| 2014/0127121 A1 * | 5/2014 | Maass | ..................... | C01B 32/05 |
| | | | | 423/445 R |
| 2014/0356744 A1 * | 12/2014 | McAlister | ........... | H01M 8/0618 |
| | | | | 422/162 |
| 2015/0321912 A1 | 11/2015 | Machhammer et al. | | |

FOREIGN PATENT DOCUMENTS

| | | | | |
|---|---|---|---|---|
| WO | 2012023858 A1 | 2/2012 | | |
| WO | WO-2017035269 A1 * | 3/2017 | ................ | B01J 8/12 |
| WO | 2021195566 | 9/2021 | | |

OTHER PUBLICATIONS

"Communication Pursuant to Rule 114(2) EPC, mailed Nov. 8, 2024 pgs. all".

Belik, Sergej , "Development of high-perforamnce air heater based on an inductively heated packed bed", IEEE, Thermal Process Technology, Sep. 1, 2021.

International Search Report and Written Opinion for PCT Application PCT/US2021/024487, mailed Jun. 9, 2021.

"Extended European Search Report for EP21775155.1, mailed on Mar. 24, 2025".

Examination Report for CA Appl. No. 3, 177,381, mailed Jan. 18, 2024 pp. all pages.

* cited by examiner

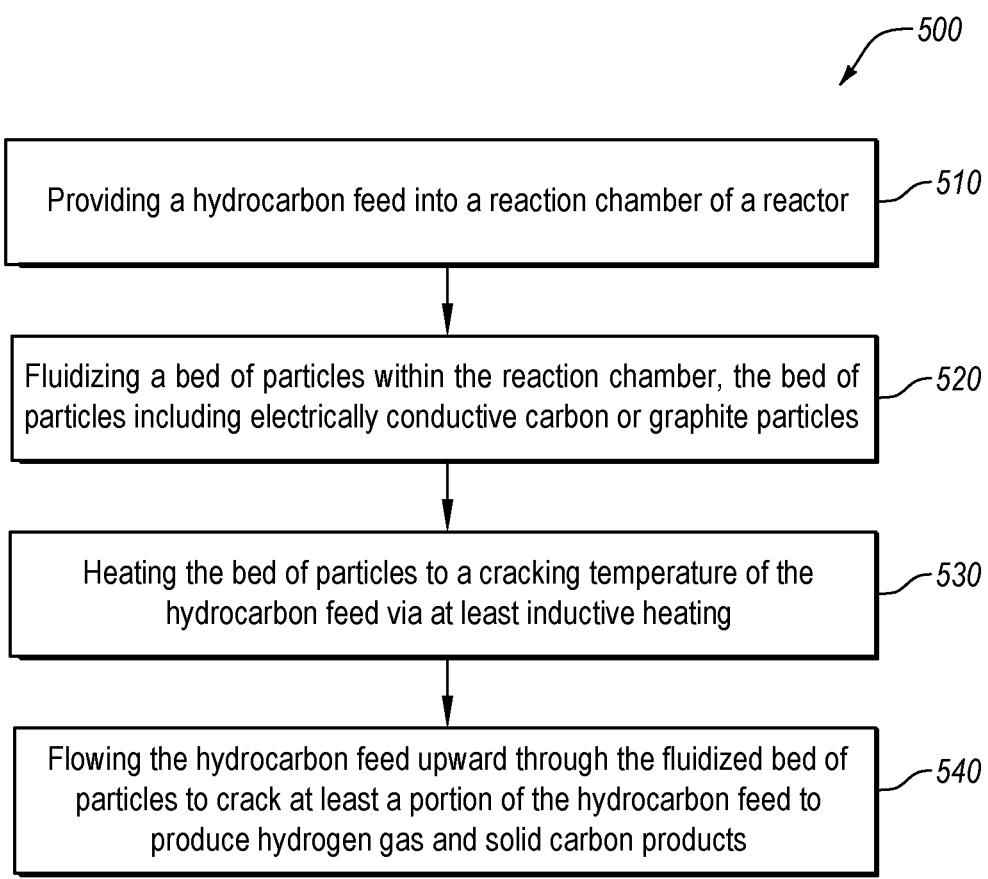

500

Providing a hydrocarbon feed into a reaction chamber of a reactor — 510

Fluidizing a bed of particles within the reaction chamber, the bed of particles including electrically conductive carbon or graphite particles — 520

Heating the bed of particles to a cracking temperature of the hydrocarbon feed via at least inductive heating — 530

Flowing the hydrocarbon feed upward through the fluidized bed of particles to crack at least a portion of the hydrocarbon feed to produce hydrogen gas and solid carbon products — 540

FIG. 5

HYDROGEN PRODUCTION AND CARBON SEQUESTRATION VIA HIGH TEMPERATURE CRACKING OF NATURAL GAS IN AN INDUCTIVELY HEATED FLUIDIZED CARBON PARTICLE BED

CROSS-REFERENCE TO RELATED APPLICATIONS

This application is a 35 U.S.C. § 371 National Stage Application of PCT Application No. PCT/US2021/024487, filed Mar. 26, 2021, which claims the benefit under 35 U.S.C. § 119 of the earlier filing date of U.S. Provisional Application Ser. No. 63/000,913 filed Mar. 27, 2020, the disclosure of which is incorporated herein, in its entirety, by this reference.

BACKGROUND

Hydrogen gas can be used for combustion and chemical synthesis among other applications. Hydrogen gas is often produced by steam-methane reforming, gasification, or electrolysis. However, some of the production processes such as steam-methane reformation can produce undesirable pollutants, such as $CO_2$. The power consumption for production of hydrogen from water via electrolysis is a costly barrier to efficient, cost-effective hydrogen production.

Hydrogen production can be accomplished by cracking hydrocarbons, such as natural gas or even pure methane. Further, the carbon solid product must be separated from the hydrogen gas product. Thermal cracking of natural gas may be accomplished using catalysts and high temperatures. However, heating to the cracking temperature range is energy intensive. Additionally, catalysts can be expensive and must be separated from the products of cracking. Accordingly, hydrogen producers seek systems and methods for producing hydrogen gas without the drawbacks of conventional thermal cracking processes.

SUMMARY

Embodiments of the invention relate to systems and methods for cracking hydrocarbons into hydrogen gas and carbon using a heated and fluidized bed of electrically conducting carbon, graphite, or other particles.

In an embodiment, a system for cracking hydrocarbons into hydrogen gas and carbon is disclosed. The system includes a reactor having a reaction chamber therein. The system includes a bed of particles disposed in the reaction chamber, the bed of particles including one or more of electrically conductive carbon or graphite particles. The system includes an induction unit surrounding the bed of particles, the induction unit having induction coils for producing heat in the bed of particles.

In an embodiment, a method for cracking hydrocarbons into hydrogen gas and carbon is disclosed. The method includes providing a hydrocarbon feed into a reaction chamber of a reactor. The method includes fluidizing a bed of particles within the reaction chamber, the bed of particles including electrically conductive carbon or graphite particles. The method includes heating the bed of particles to a cracking temperature of the hydrocarbon feed via at least inductive heating or plasma heating. The method includes flowing the hydrocarbon feed upward through the bed of particles to crack at least a portion of the hydrocarbon feed to produce hydrogen gas and carbon products.

In an embodiment, a system for cracking hydrocarbons into hydrogen gas and carbon is disclosed. The system includes a reactor having a reaction chamber therein. The system includes a bed of particles disposed in the reaction chamber, the bed of particles including one or more of electrically conductive carbon, graphite, or other particles. The system includes at least two electrodes in electrical contact with the bed of particles, wherein the at least two electrodes are spaced from each other such that when connected to a power supply, electric current passes from one electrode to at least the second electrode to produce heat.

In an embodiment, a system for cracking hydrocarbons into hydrogen gas and carbon is disclosed. The system includes a reactor having a reaction chamber therein. The system includes a bed of particles disposed in the reaction chamber, the bed of particles including one or more of electrically conductive carbon, graphite, or other particles. The system includes one or more microwave heaters positioned in the reaction chamber to provide microwave heating to the bed of particles.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

Embodiments of the invention relate to systems and methods for cracking hydrocarbons into hydrogen gas and solid carbon using a heated and fluidized bed.

The drawings illustrate several embodiments of the invention, wherein identical reference numerals refer to identical or similar elements or features in different views or embodiments shown in the drawings.

FIG. 5 is a flow diagram of a method for cracking hydrocarbons into hydrogen gas and carbon solid, according to an embodiment.

DETAILED DESCRIPTION

Embodiments of the invention relate to methods and systems for pyrolytically converting hydrocarbon feedstock into hydrogen gas and carbon using a heated, fluidized bed of particles, such as electrically conducting carbon, graphite, or other particles. The bed of particles can be heated with electromagnetic power such as inductive heating. Microwave, plasma, or joule heating can be used in addition to or as an alternative to inductive heating. Hydrocarbon gas feedstock streams such as natural gas (which has a high methane concentration) can be heated at least to high temperatures (e.g., 800° C.-1,400° C.) to crack the hydrocarbon gas feedstock without the presence of a specially added catalyst. Rather, the carbon particles themselves in the fluidized bed of particles can act as a catalyst.

Fluidized beds provide very good mixing of a population of solid particles within a vertical chamber where a gas is flowing upward through the bed of particles at a flow rate and velocity to suspend the particles and the entire bed of particles exhibits liquid like behavior. Fluidized beds provide very high rates of heat and mass transfer between the particles and the gas phases passing therethrough. The fluidized bed reactors, systems and methods disclosed therein overcome many of the problems of other high temperature pyrolytic processes. In comparison to the use of a liquid metal bath for providing pyrolytic conversion of natural gas, the systems and methods disclosed herein provide relatively easy carbon collection; operation at lower temperature and pressure; greater flexibility in using electromagnetic power for heating; and greater ease of using both combustion and electromagnetic heating.

Figure 1:
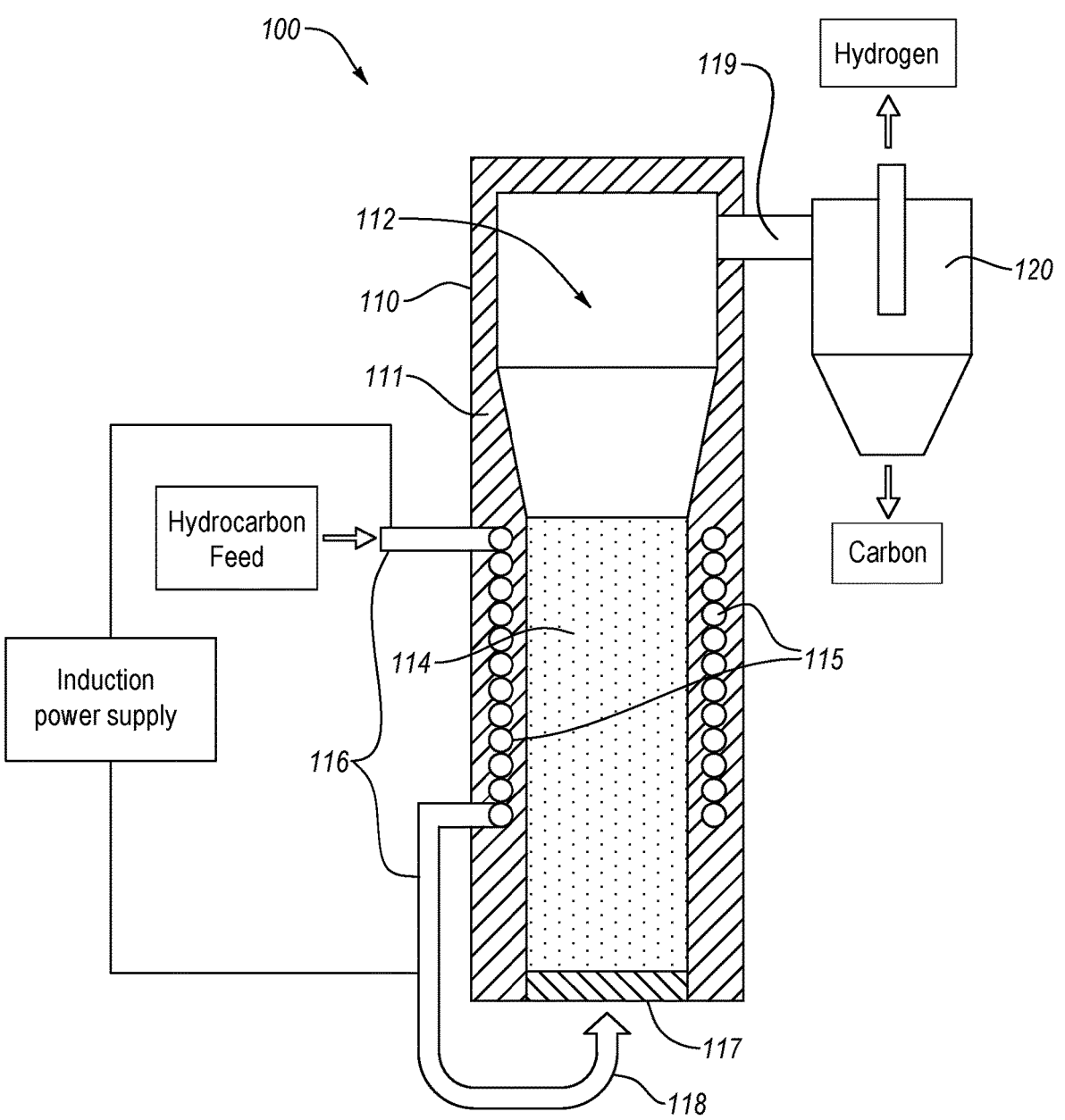
FIG. 1 is a schematic of a system for cracking hydrocarbons into hydrogen gas and solid carbon, according to an embodiment.

FIG. 1 is a schematic of a system 100 for cracking hydrocarbons into hydrogen gas and solid carbon, according to an embodiment. The system 100 includes a reactor 110 having a reaction chamber 112 therein. The reaction chamber 112 includes a bed of particles 114 disposed therein. The bed of particles 114 is a fluidized bed during use. The reactor 110 includes a feed input 116 having a feed inlet 118 fluidly connected to the reaction chamber 112. The reactor 110 includes a distributor plate 117 in the reaction chamber 112, such as at the bottom of the reaction chamber 112. The feed inlet 118 may be fluidly connected to the distributor plate 117 to distribute the input hydrocarbon feedstock across a lateral plane or cross-section of the reaction chamber 112. The reactor 110 may include induction coils 115 disposed around the bed of particles 114. The induction coils 115 may be used to heat the bed of particles. During use, the bed of particles 114 is fluidized by fluid (e.g., at least the hydrocarbon feedstock) flowing upwardly therethrough. The bed of particles 114 is heated at least in part by the induction coils 115 to at least the cracking temperature of the hydrocarbon feedstock effective to crack the hydrocarbon feedstock to form hydrogen gas and carbon as the feedstock flows upwardly through the fluidized bed. Product gases and carbon (e.g., solids) are removed from the reactor 110 via output conduit 119. Output conduit 119 may be coupled to a separator 120 for separating the hydrogen gas product from the solid carbon product.

The reactor 110 includes a vertical tube (e.g., cylinder) constructed from an electrically non-conductive insulating material such as high alumina refractory materials forming at least a portion of the walls 111 (e.g., inner walls) thereof. In some examples, the walls 111 include a multilayer construction with at least an inner wall and an outer wall. The walls 111 may include non-conductive insulating bricks, mortar, etc. on the inner wall. Accordingly, the walls 111 of the reactor 110 may be refractory walls. Other materials that exhibit some thermal insulating characteristics and are electrically non-conductive may be utilized. The walls 111 (e.g., outer walls) may include one or more metals, such as refractory metals. For example, an outer wall may include a metal wall. In such examples, the inner wall may include insulating bricks and mortar as disclosed above. The walls 111 (e.g., at least the outer wall) may form a substantially fluid tight seal to retain fluids within the reactor 110. In the case of induction heating, no solidly continuous conducting material (e.g., the inner walls) should be present between the induction coils 115 and the particles in the bed of particles 114.

The inner dimensions of the walls 111 form the reaction chamber 112 within the reactor 110. The reaction chamber 112 includes a portion holding the bed of particles 114. The reaction chamber 112 may include a head space above the bed of particles 114. The headspace may be fluidly connected to an output conduit 119.

A lateral dimension(s) of the reaction chamber 112 where the bed of particles (e.g., fluidized bed) is disposed may vary as a function of height above a bottom of the reaction chamber 112. For example, the inner lateral dimensions of the reaction chamber 112 may vary as a function of height in the reaction chamber 112. In examples, the reaction chamber 112 may widen above the bed of particles 114 in the headspace to a widest dimension. For example and as shown in FIG. 1, the reaction chamber 112 may include a particle disengagement section wherein the dimensions of the reaction chamber are increased to allow the carbon particles to disengage from the hydrogen gas produced via pyrolysis. In some examples, the lateral dimensions of the reaction chamber 112 may remain constant or may narrow or widen as a function of height within the reaction chamber 112.

Although the fluidized bed reactor system shown in FIG. 1 has a constant lateral dimension(s) (e.g., radius) at the bed of particles 114, it can be advantageous to vary the lateral dimension(s) as a function of height. This variation can increase methane-to-hydrogen conversion efficiency and reduce the heating power used to pyrolyze the feedstock. For example, it can be advantageous for the radius to increase as function of height above the bottom of the bed of particles 114. With variable diameter, the local velocity of the feedstock can be adjusted, in order to provide appropriate conditions for fluidization of the bed of particles 114 and residence time of the feedstock passing therethrough.

The bed of particles 114 includes a plurality of particles in the reaction chamber 112. The particles in the bed of particles 114 may include one or more of electrically conductive carbon or graphite particles. In some examples, other electrically conductive particles may be used. The bed of particles 114 may consist of, or consist essentially of, electrically conductive carbon particles (e.g., may be only carbon or graphite). For example, metal catalysts or metals may not be present in the bed of particles 114. The particles may be selected to be heated by electromagnetic heating (e.g., induction) and to heat the hydrocarbon feedstock passing therethrough and to catalyze pyrolysis reaction therewith. One or more of the size, weight, or porosity of the particles in the bed of particles may be selected to provide a selected heat absorption from the electromagnetic heating (e.g., inductive, microwave, etc.), pyrolysis speed, particle drop rate within the fluidized bed (e.g., deposition of carbon thereon), or the like. The preferred particulate material in the fluidized bed is carbon or graphite but other electrically conductive (or magnetic) materials may be used in some examples.

The bed of particles 114 includes a fluidized bed. The bed of particles 114 may be fluidized at least by the hydrocarbon feedstock flowing upward therethrough. In some examples, an inert gas (e.g., nitrogen) may alternatively or additionally be flowed upward through the bed of particles 114 to fluidize the particles. In some examples, the gases may include hydrogen and oxygen (e.g., air), such as to combust within the bed of particles 114. In some examples, the gases may change during operation, such as starting the fluidization with hydrogen and oxygen or an inert gas and switching over to hydrocarbon gas feedstock when the fluidized bed is at a selected temperature. The composition of the gas flowing through the bed of particles 114 may change as a function of height within the bed of particles, such as having a higher hydrogen content in upper portions of the bed of particles 114. For example, as the hydrocarbon is cracked the composition of the fluidizing gas will change to hydrogen or mixtures of hydrocarbon and hydrogen.

The system 100 includes an induction unit for heating the bed of particles 114. The induction coils 115 heat the bed of particles 114 to at least the reaction temperature (e.g., pyrolysis or cracking temperature) of the hydrocarbon feedstock (e.g., methane or other components of natural gas). The induction coils 115 of the induction unit induce an alternating electromagnetic field in conductive material (e.g., a susceptor such as carbon or graphite particles in the bed of particles 114) to heat the material via eddy currents or any other electrical means. Inductive heating provides a way to directly heat particles in the bed of particles 114 (when fluidized or when not fluidized), not through convection, radiation, or conduction from other heated elements. In examples, the thermal energy input to the bed of particles 114 includes inductively coupling alternating current with electrically conductive or magnetic particles (e.g., carbon or graphite particles) thereby heating the particles via non-contact and non-line-of-sight methods. Magnetic particles may be heated up to the Curie temperature.

The induction coils 115 may be part of an induction unit surrounding the bed of particles 114. The induction coils 115 may be operably coupled to an energy source or power supply for supplying alternating electric current thereto. Although the induction coil 115 in FIG. 1 shows uniformly vertically-spaced turns, the turns may be closer or farther spaced in one or more vertical locations to adjust the heating profile of the induction heating. The heating profile can be controlled by using open loop control that uses predetermined information about the effect of the heating profile on various system performance parameters. These parameters can include the energy conversion efficiency of producing net hydrogen from natural gas where the net efficiency takes into account hydrogen use for electrical heating. The induction coils 115 may include any number of coils. The induction coils 115 may include one or more sets of induction coils. The induction coils 115 may include coils of any material capable of inductively heating a material adjacent to the coil, such as within the diameter of the coils, via alternating current passed through the coil. Such material may include copper The induction coils 115 may be disposed within the wall 111 as shown, such as between the outer and inner surfaces of the wall 111. In some examples, the induction coils may be disposed inside of the wall 111, such as in the reaction chamber 112. In some examples, the induction coils may be disposed outside of the wall 111. In such examples, no conductive materials may be disposed between the induction coils 115 and the bed of particles 114. In some examples, the induction coils 115 may be vertically disposed along at least a portion of the longitudinal axis of bed of particles 114.

In some examples (not shown), the induction coils 115 may include a plurality of induction coils. In such examples, the plurality of induction coils may include first induction coils with a number of coils, size, number of turns, or diameter to deliver a first amount of heat and at least second induction coils with a number of coils, size, number of turns, or diameter to deliver at least a second amount of heat. In such examples, the first induction coils may be disposed around a first vertical portion of the bed of particles 114 and the at least a second amount of induction coils may be disposed around a second vertical portion of the bed of particles 114. The first and second induction coils may be separately controlled to provide a selected temperature profile in the reaction chamber 112. Accordingly, different vertical portions of the bed of particles 114 may be selectively heated to different temperatures. For example, the lower portion of the bed of particles 114 may be heated to a lower temperature than an upper portion of the bed of particles 114 or vice versa. Any number of induction coils (or sets thereof) may be used (such as 2 or more) to selectively control the temperature within the bed of particles 114 in one or more vertical regions therein. The induction coils 115 may have varying numbers of loops each independently controlled by different circuits to provide spatially controlled heating. The power levels can be varied for each independent coil or they can all be operated with the same power level but impart different levels of heating depending on the number of turns in each separate coil. Each induction coil of a multiple induction coil set may be driven by a different power supply, providing different power and potentially operating at different frequencies to provide a selected temperature profile between the sets of coils. The amount of heating from the different coils can be controlled by open loop control using predetermined information about the heating effectiveness of the different coils at different stages of the pyrolytic process. The amount of heating can also be determined by open closed loop control based on various sensed parameters that can include the natural gas to hydrogen conversion efficiency.

During use, hydrocarbon feedstock (e.g., natural gas) is introduced into an inlet in the refractory wall of the fluidized bed conversion unit and is preheated by the heat that is provided by the induction coils 115. The preheated natural gas then is directed into the bed of particles 114 (e.g., fluidized bed). Alternatively, the natural gas can be preheated in a heat exchanger. The heat of the processed gases can be used to partially increasing the temperature of the natural gas minimizing the required external power. The inductive heating couples very effectively to the carbon particles in the bed of particles 114, producing temperatures in the range of 900° C. to 2,500° C. The high temperature provides very effective conversion of the natural gas into hydrogen. Cracking natural gas is highly endothermic, but one or more of the external heating sources disclosed herein maintain the appropriate temperature for the process.

In some examples, the induction coils 115 may be hollow to accommodate input of feedstock therethrough. In such examples, the feedstock may be at least partially preheated prior to input into the reaction chamber 112. In some examples, the conduit for inputting the feedstock may be run in parallel to the induction coils 115, such as within the wall 111 to allow the feedstock to at least partially preheat prior to input into the reaction chamber 112. In such examples, the conduit may be wound around at least a portion of the reaction chamber 112.

The energy source for supplying an alternating electric current to the induction coils 115 may include a municipal or grid electricity supply, wind power, solar power, geothermal power, hydroelectric power, generator power, power generated from combusting the hydrogen produced in the reactor 110, or combinations of any of the foregoing. In some examples, such as during times of high electricity demand, an off-grid generator may deliver some power to reactor 110 and some power to the grid.

The reactor 110 may be configured as an updraft reactor, wherein the reactor 110 includes a feed inlet 118 at a bottom of the reaction chamber 112. The feed inlet 118 may be fluidly connected to the distributor plate 117 to supply hydrocarbon feedstock via the feed input 116. The distributor plate 117 may be a manifold for splitting a single stream into a plurality of streams. For example, the distributor plate 117 may diffuse the single stream of feedstock into a plurality of streams across a lateral cross-section or plane of the reaction chamber 112. While distributor plates 117 are disclosed herein, reactors may utilize alternative configurations for flowing gas into the reaction chamber to form the fluidized bed, including a spouted bed operation with one or more inlet orifices for the incoming gas, or the like. For example, the distributor plate 117 may be eliminated and the fluidized bed may be operated as a spouted bed or other types of orifices could be used to introduce the hydrocarbon feedstock into the bottom of reaction chamber 112.

The reactor 110 is operably coupled to a feed supply, such as a natural gas supply or another hydrocarbon feedstock via the feed input 116. The feed supply may include one or more of a steam supply, an oxygen supply, an air supply, or the like for mixing with the natural gas to form the hydrocarbon feedstock. The feed input 116 may include one or more conduits capable of delivering hydrocarbon feedstock (e.g., natural gas) at selected pressures, without leaking or rupturing.

As the hydrocarbon feedstock is flowed through the bed of particles, the temperature in the bed of particles 114 at or above the cracking temperature of the hydrocarbon feedstock (e.g., methane), the hydrocarbon feedstock at least partially pyrolyzes the feedstock to form hydrogen gas and carbon. The hydrogen gas and carbon may be collected removed therefrom, such as via the output conduit 119.

The pyrolyzed feedstock may be moved to the separator 120 for separating the hydrogen gas product from the solid carbon product. The separator 120 may include a residence chamber for allowing the carbon solids to fall from the pyrolyzed feedstock, a cyclone separator, an electrostatic precipitation apparatus, or by the use of a filter. Such filters may include a "candle" filter with ceramic material, a metallic filter with pores, or a fabric filter (e.g., a bag house). The separator 120 may include an outlet for removing the hydrogen and an outlet from removing the carbon therefrom. The outlet for removing carbon may be in the bottom of the separator 120. The separator 120 may include one or more filters for preventing carbon from passing through the outlet for removing hydrogen.

Some of the carbon produced via pyrolysis may be deposited on the particles within the fluidized bed (e.g., bed of particles with fluid(s) flowing therethrough sufficient to fluidized the particles). In such examples, the particles in the fluidized bed may flow downward as they increase in size due to deposition of carbon thereon. Notwithstanding the foregoing, the conductive carbon or graphite particles in the bed of particles 114 differ from the solid carbon produced from pyrolyzing (e.g., cracking) the hydrocarbon feedstock.

One or more of plasma heating, joule heating, or microwave (or millimeter) heating can be used in addition to or alternatively to the inductive heating disclosed above. These heating sources can be used to provide advantageous variations in the heating as a function of position in the reaction chamber—specifically in the bed of particles—or in the case of microwave heating, heating of the carbon that is released above the bed.

Figure 2:
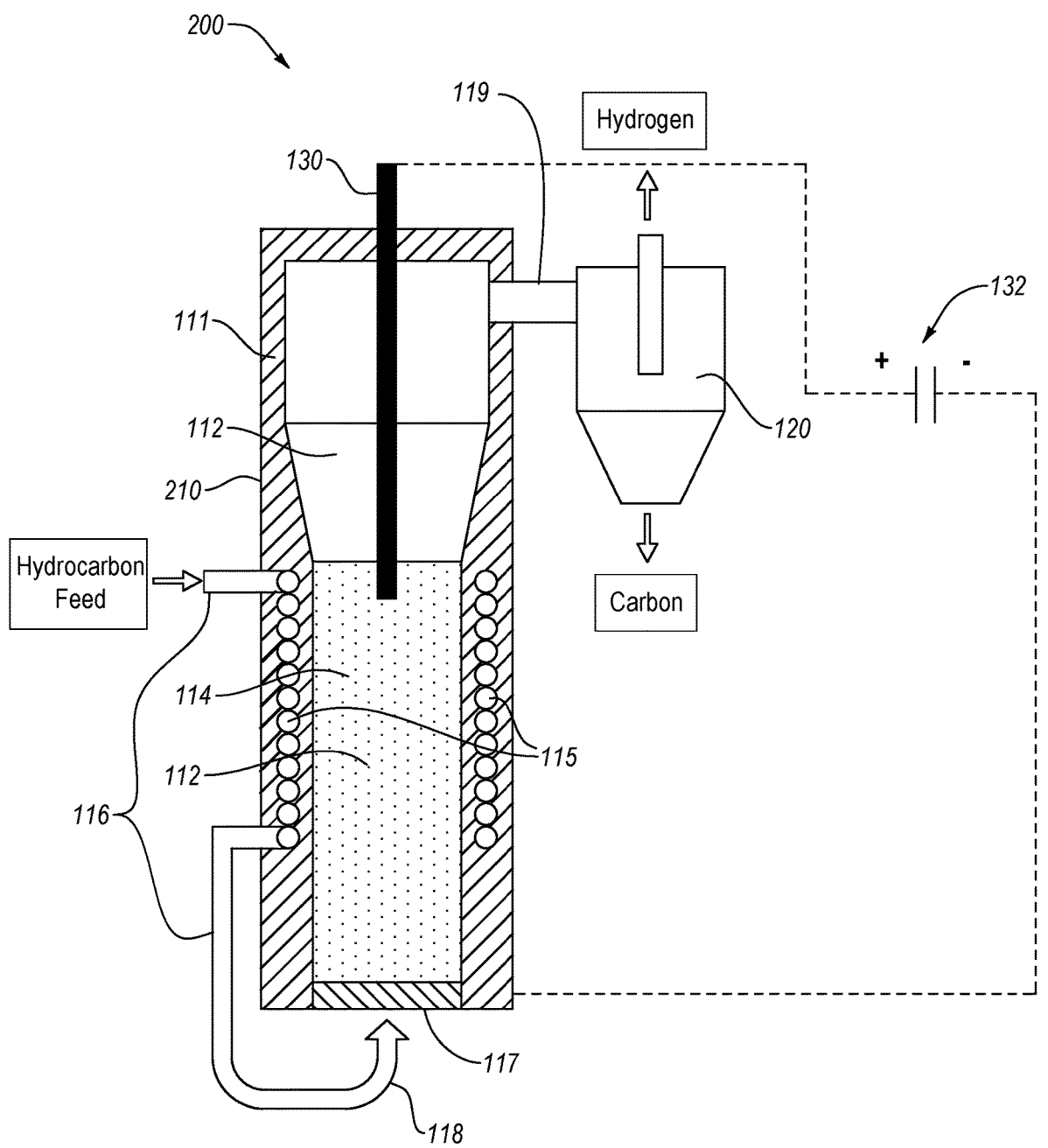
FIG. 2 is a schematic of a system for cracking hydrocarbons into hydrogen gas and solid carbon, according to an embodiment.

Plasma heating using at least one plasma arc electrode submerged in the fluidized bed can be used for selectively heating at least a portion of the bed of particles. FIG. 2 is a schematic of a system 200 for cracking hydrocarbons into hydrogen gas and solid carbon, according to an embodiment. The system 200 is similar or identical to the system 100 in one or more aspects. The system 200 includes a reactor 210 having the reaction chamber 112 therein. The reaction chamber 112 includes the bed of particles 114 disposed therein. The bed of particles 114 is a fluidized bed during use. The reactor 210 includes the feed input 116 having the feed inlet 118 fluidly connected to the reaction chamber 112. The reactor 210 includes the distributor plate 117 fluidly connected to the reaction chamber 112, such as at the bottom of the reaction chamber 112. The reactor 210 may include an induction unit including induction coils 115 disposed around the bed of particles 114. The bed of particles 114 is heated at least in part by the induction coils 115 to at least the cracking temperature of the hydrocarbon feedstock. The reactor 210 includes at least one plasma arc electrode 130 for heating the bed of particles 114. For example, at least one plasma arc electrode 130 may extend into the reaction chamber 112 from the top of the reactor 210. The at least one plasma arc electrode is operably coupled to power supply 132, such as a DC power supply, for suppling electrical power thereto.

The at least one plasma arc electrode 130 is in contact with the bed of particles 114, such that at least some of the electrically conductive particles (e.g., carbon or graphite particles) therein are in electrical (e.g., direct or through ionized gas or plasma) contact with the at least one plasma arc electrode 130 sufficient to contact the particles with plasma formed therefrom. At least a second plasma arc electrode 130 may be located in the bottom of the bed of particles 114. Heating of the bed of particles 114 may be via both joule heating in the plasma zone and joule heating via the passage of current from the first plasma electrode to the second plasma electrode. The at least one plasma arc electrode 130 may be a graphite electrode or the like.

The reactor 210 may be heated completely by the joule and plasma heating or in combination with induction heating. The second plasma electrode may be located along the vertical length of the bed of particles 114 of reactor 210 if induction heating is not used.

The induction coils 115 may be disposed around at least a portion of the vertical length of the bed of particles 114. The induction coils 115 are part of an induction unit having an energy source or power supply for providing alternating electric current to the induction coils 115. The at least one plasma arc electrode 130 may be disposed in at least a portion of the vertical length of the bed of particles 114. The at least one plasma arc electrode 130 may be disposed in the same or a portion of the vertical length of the bed of particles 114 as the at least one plasma arc electrode 130. The at least one plasma arc electrode 130 may provide an electric (e.g., plasma) arc in the bed of particles 114 with the induction coils 115. Accordingly, the at least one plasma arc electrode 130 may provide additional or alternative heat into the bed of particles 114 with the induction coils 115. The at least one plasma arc electrode 130 and the induction coils 115 may be controlled separately. For example, the bed of particles 114 may be heated solely by plasma from the at least one plasma arc electrode.

In some examples, joule heating using one or more joule heating electrodes submerged in the fluidized bed can be used for heating the bed of particles 114. One or more (e.g., at least two) joule heating electrodes may extend into the bed of particles to provide heat thereto. For example, the at least one plasma arc electrode 130 may flow current through the bed of particles 114 to the distributor plate 117, which results in joule heating. Accordingly, the one or more plasma electrodes 130 may be used as one or more joule heating electrodes. In such examples, the one or more joule heating electrodes are operably coupled to a power supply to provide electrical power to the joule heating electrodes. For example, three electrodes may be used, driven through a 3-phase transformer. The joule heating may be provided in combination with plasma heating from the plasma heating electrode(s).

During use, the bed of particles 114 is fluidized by fluid (e.g., hydrocarbon feedstock) flowing upwardly therethrough. As the feedstock is heated to selected temperatures in specific vertical potions of the reaction chamber 112 via one or more of inductive or plasma heating, the feedstock is pyrolyzed to form hydrogen gas and carbon products. The selected temperatures can be determined by open loop control using predetermined information about the dependence of various process performance parameters on the selected temperatures at various locations in the fluidized bed. Product gases and carbon solids are removed from the reactor 210 via output conduit 119. Output conduit 119 may be coupled to a separator 120 for separating the hydrogen gas product from the solid carbon product.

Figure 3:
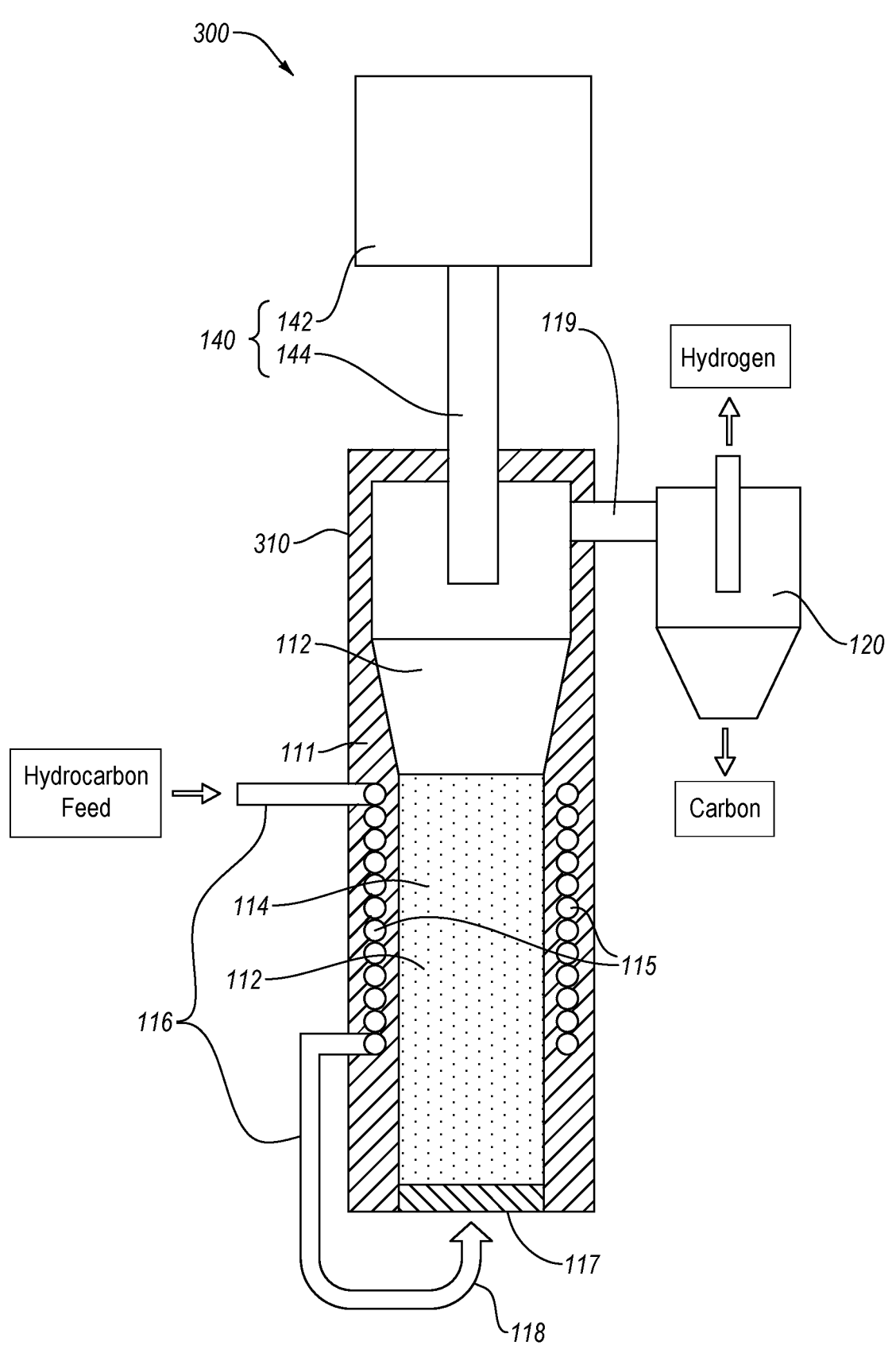
FIG. 3 is a schematic of a system for cracking hydrocarbons into hydrogen gas and solid carbon, according to an embodiment.

It may also be advantageous to use microwave or millimeter wave heating of the bed of particles. In some examples, the thermal energy input to the disclosed process involves microwave heating with the conducting particles. The microwave heating can provide volumetric heating throughout the bed because of the gaps between the particles. There is no skin depth current that would limit microwave penetration as would be the case with of a solid block of particles. A low cost microwave heating system could be provided by a large number of low cost magnetron sources with appropriate waveguide or antennas for directing the microwave radiation into the fluidized bed. Open loop control using predetermined information may be used to vary the relative amounts of microwave, inductive, plasma and/or joule heating as a function of time and spatial location. The predetermined information may include the dependence of conversion of natural gas to hydrogen upon the relative amounts of these heating sources that are used at various spatial positions and times in the pyrolytic conversion process, FIG. 3 is a schematic of a system 300 for cracking hydrocarbons into hydrogen gas and solid carbon, according to an embodiment. The system 300 is similar or identical to the system 100 or 200 in one or more aspects. The system 300 includes a reactor 310 having the reaction chamber 112 therein. One or more walls 111 define the reaction chamber 112. The reaction chamber 112 includes the bed of particles 114 disposed therein. The bed of particles 114 is a fluidized bed during use. The reactor 310 includes the feed input 116 having the feed inlet 118 fluidly connected to the reaction chamber 112. The reactor 310 includes the distributor plate 117 fluidly connected to the reaction chamber 112, such as at the bottom of the reaction chamber 112. The reactor 310 may include an induction unit including induction coils 115 disposed around the bed of particles 114. The system 300 (e.g., reactor 310) includes at least one microwave heater 140. The at least one microwave heater 140 is positioned in the reactor 110 to heat the bed of particles 114. The at least one microwave heater 140 includes a microwave source 142 and at least one waveguide 144. For example, the at least one waveguide 144 may extend into the reaction chamber 112 from the top of the reactor 310. The at least one waveguide 144 may be positioned and aimed to direct the microwave radiation into the reaction chamber (e.g., bed of particles 114), such that at least some of the electrically conductive particles (e.g., carbon or graphite particles) therein are heated by microwave radiation emitted therefrom. The at least one waveguide 144 may extend into the reaction chamber 112 from the top of the reactor 310. The at least one microwave heater 140 is operably coupled to a power supply for suppling electrical power thereto. The bed of particles 114 is heated at least in part by the induction coils 115 and the microwave heater 140 to at least the cracking temperature of the hydrocarbon feedstock.

The induction coils 115 may be disposed around at least a portion of the vertical length of the bed of particles 114. The induction coils 115 are part of an induction unit having an energy source or power supply for providing alternating electric current to the induction coils 115. The at least one waveguide 144 may be directed into the bed of particles 114 to provide additional or alternative heat into the bed of particles 114 in combination with the induction coils 115. The microwave heater 140 and the induction coils 115 may be controlled separately.

During use, the bed of particles 114 is fluidized by fluid (e.g., hydrocarbon feedstock) flowing upwardly therethrough. As the feedstock is heated to selected temperatures in specific vertical potions of the reaction chamber 112 via one or more of inductive, microwave heating, or plasma heating, the feedstock is pyrolyzed to form hydrogen gas and carbon products. Product gases and carbon solids are removed from the reactor 310 via output conduit 119. Output conduit 119 may be coupled to a separator 120 for separating the hydrogen gas product from the solid carbon product.

The one or more of induction, plasma, joule, combustion, or microwave heating of the bed of particles 114 allows the reactor systems and pyrolyzation techniques herein to operate at very high temperatures in the bed of particles 114 (e.g., fluidized bed), such as in the range of 900° C. to 2,500° C.

In examples where only joule, plasma, or microwave heating are independently or in combination used to heat the bed of particles 114, the induction coils 115 may be used as a heat exchanger to preheat the hydrocarbon gas prior to introducing to the reaction chamber 112. In some examples, a heat exchanger may be disposed in the walls 111 (e.g., different from the induction coils 115). In such examples, the heat exchanger may preheat the hydrocarbon feedstock to a higher temperature without having also high electrical resistivity of the induction coils because of the high temperature.

Figure 4:
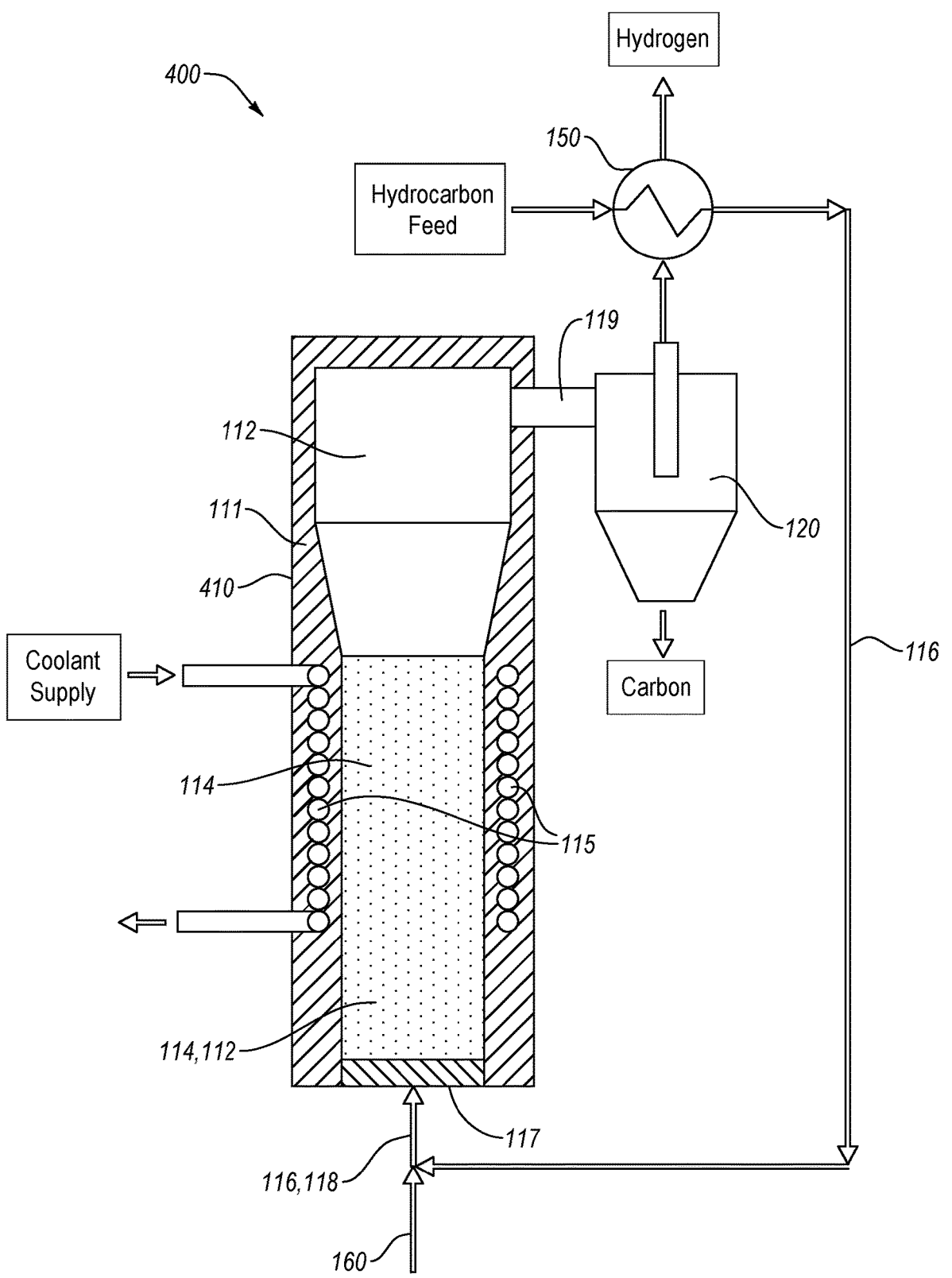
FIG. 4 is a schematic of a system for cracking hydrocarbons into hydrogen gas and solid carbon, according to an embodiment.

In some examples, heat from the exiting product stream(s) may be utilized to preheat or augment the hydrocarbon feedstock input into the reaction chamber. FIG. 4 is a schematic of a system 400 for cracking hydrocarbons into hydrogen gas and solid carbon, according to an embodiment. The system 400 is similar or identical to the system 100, 200, or 300 in one or more aspects. The system 400 includes a reactor 410 for pyrolyzing hydrocarbon feedstock therein. The reactor 410 includes one or more walls 111 defining the reaction chamber 112. The reaction chamber 112 includes the bed of particles 114 disposed therein. The bed of particles 114 is a fluidized bed during use. The reactor 410 includes the feed input 116 having the feed inlet 118 fluidly connected to the reaction chamber 112. The reactor 410 includes the distributor plate 117 fluidly connected to the reaction chamber 112, such as at the bottom of the reaction chamber 112. The reactor 410 may include an induction unit including induction coils 115 disposed around the bed of particles 114. The bed of particles 114 is heated at least in part by the induction coils 115 to at least the cracking temperature of the hydrocarbon feedstock to produce hydrogen gas and carbon. The system 400 includes a recuperator 150 to recover at least some of the thermal energy from the product hydrogen gas.

The induction coils 115 may be disposed around at least a portion of the vertical length of the bed of particles 114, such as within the walls 111. The induction coils 115 are part of an induction unit having an energy source or power supply for providing alternating electric current to the induction coils 115. The induction coils 115 may be water cooled in some examples. For example, the induction coils 115 may be tubular copper coils or the like where the inside of the tubes are fluidly connected to a coolant source (e.g., cooling fluid, such as water, oil, or the like) for circulating coolant therethrough at a selected rate. The coolant source may include one or more of a reservoir, a radiator, a pump, or the like. In such examples, the induction coils 115 may run into and out of the walls 111 to selectively control the temperature of one or more of the induction coils 115 or the reaction chamber 112.

During use, the bed of particles 114 is fluidized by fluid (e.g., hydrocarbon feedstock) flowing upwardly therethrough. As the feedstock is heated to selected temperatures in specific vertical potions of the reaction chamber 112 via one or more of inductive, microwave heating, or plasma heating, the feedstock is pyrolyzed to form hydrogen gas and carbon products. Product gases and carbon solids are removed from the reactor 410 via output conduit 119. Output conduit 119 may be coupled to a separator 120 for separating the hydrogen gas product from the solid carbon product.

As the hydrogen product gas is remove from the separator 120, the hydrogen gas can be directed through the recuperator 150 to recover thermal energy from the hydrogen gas. In some examples, the recuperator 150 is fluidly coupled to the output of the reactor 410 such as directly connected to the hydrogen gas output of the separator 120. The recuperator 150 may be operably coupled to a hydrocarbon feed input 116 wherein the thermal energy recovered from the hydrogen product gas is transferred to the incoming hydrocarbon feed in the feed input 116. For example, the recuperator 150 may include a heat exchanger, such as a shell and tube heat exchanger or the like. Accordingly, the recuperator 150 may preheat the hydrocarbon feedstock before the hydrocarbon feedstock is introduced into the bed of particles 114. By preheating the incoming hydrocarbon feedstock, the system 400 reduces the amount of energy utilized in induction, plasma, microwave, or joule heating to reach the cracking temperature of the hydrocarbon feedstock.

The heated hydrocarbon feedstock may be augmented with unheated hydrocarbon feedstock from an additional input 160. The mixture of heated to unheated hydrocarbon feedstock may be adjusted to provide a selected temperature for the combined feedstock stream when entering the reactor 410. The choice of the selected temperature can be determined by open loop control using predetermined information about various fluidized bed performance parameters such as the efficiency of conversion of the hydrocarbon feedstock to hydrogen. A closed loop control system can be used to adjust the mixture of heated to unheated feedstock using information from a temperature sensor such as a thermocouple, infrared pyrometer or millimeter wave pyrometer.

Components of the systems 100-400 disclosed herein may be used with components of the other systems 100-400 disclosed herein. For example, the heating components of the systems may be used in combination with each other.

The systems 100-400 disclosed herein may be operably coupled to any of a plurality of electricity sources, such as municipal electricity sources, renewable electricity sources (e.g., solar, wind, hydroelectric, geothermal), generators, turbines, or the like. The electricity sources may be utilized to operate one or more components of any of the systems disclosed herein, such as the electromagnetic heating components (e.g., induction unit, microwave heat source, plasma heating electrodes, joule heating electrodes, or the like). Any of the systems disclosed herein may include one or more controllers (not shown) equipped to control delivery of electricity to the component(s) to selectively heat the bed of particles in the reaction chamber. The one or more controllers may control one or more valves in the feed input, the distributor plate, the outlet, or the separator.

The systems disclosed herein provide energy efficient cracking of hydrocarbons to form hydrogen gas and carbon solid products. Accordingly, the path of hydrocarbon feedstock through the systems 100-400 are demonstrative of methods for producing hydrogen gas and carbon solid products.

Methods for cracking hydrocarbons into hydrogen gas and carbon can be carried out at least as disclosed below. FIG. 5 is a flow diagram of a method 500 for cracking hydrocarbons into hydrogen gas and carbon solid, according to an embodiment. The method 500 includes a first block 510 of providing a hydrocarbon feed into a reaction chamber of a reactor; a second block 520 of fluidizing a bed of particles within the reaction chamber, the particles including electrically conductive carbon or graphite particles; a third block 530 of heating the bed of particles to a cracking temperature of the hydrocarbon feed via at least inductive heating; and a fourth block 540 of flowing the hydrocarbon feed upward through the fluidized bed of particles to crack at least a portion of the hydrocarbon feed to produce hydrogen gas and carbon products. In some examples, any of the blocks 510-540 may be combined, split, or omitted. For example, blocks 520 and 540 may be combined into a single block. In some examples, additional blocks may be included.

The first block 510 of providing a hydrocarbon feed into a reaction chamber of a reactor may include utilizing any of the reactors of any of the systems disclosed herein. Providing the hydrocarbon feed may include introducing (e.g., flowing) natural gas, methane, or the like into the reaction chamber, such as via one or more feed inputs (e.g., conduits). In some examples, the hydrocarbon feed may be fed through the induction coils or another conduit in the reactor to at least partially preheat the hydrocarbon feed. After preheating, the hydrocarbon feed may be directed into the reaction chamber, such as via a distributor in the bottom of the bed of particles in the reaction chamber. For example, providing a hydrocarbon feed into a reaction chamber of a reactor includes introducing the hydrocarbon feed into the reaction chamber at a bottom end of the bed of fluidized particles. In some examples, the hydrocarbon feed (e.g., natural gas) may be fed directly into the bottom of the bed of particles, such as through a distributor.

The second block 520 of fluidizing a bed of particles within the reaction chamber, the particles including electrically conductive carbon or graphite particles may include fluidizing a bed of any of the particles disclosed herein. For example, the electrically conductive carbon or graphite particles may include carbon pellets, graphite pellets, graphite rods, carbon powder, graphite powder, or the like. In some examples, the electrically conductive carbon or graphite particles consist essentially of carbon. In some examples, the particles may include magnetic particles. In some examples, the particles may include carbon coated particles, such as carbon coated metal particles.

Fluidizing the bed of particles within the reaction chamber may include flowing a fluid through the reaction chamber at a rate (e.g., volume/unit time) sufficient to fluidize the bed of particles without cause the particles to be blown out of the bed of particles. For example, fluidizing the bed of particles within the reaction chamber may include flowing gas through the fluidized bed of particles at a rate that suspends the particles off of the bottom of the reaction chamber. In some examples, one or more screens or filters may be utilized to retain the particles within the reaction chamber or a discrete portion thereof.

The size of the particles may be selected to provide a desired amount of buoyancy under positive pressure as the hydrocarbon feedstock is flowed therethrough. For example, the particles may have a size selected to provide a downward flowing bed of particles during operation of the reactor. Such downward flow may be due to deposition of carbon produced by pyrolysis onto the particles, which causes the particles to drop in the bed of particles. After dropping, the particles may be collected and removed from the bottom of the fluidized bed. After dropping, the particles may be closer to the input which may recirculate some of the particles upward in the bed of particles. The particles may be removed after a certain time and replaced with new particles of a selected size.

Some examples may include a variation of the electromagnetic power heated fluidized bed approach for pyrolytic conversion of natural gas (or other hydrocarbons into hydrogen) by providing a down flow of carbon or other types of particles that are heated by inductive and/or microwave heating. Natural gas can be introduced at the bottom of this down flow and hydrogen and carbon can be produced in or above this region of particles. The particles that reach the bottom can be recirculated into the top of this fluidized bed. This approach, which could be referred to as a "downward flowing bed "approach can have the same electromagnetic heating advantages of the fluidized bed and could at least in-part use the same types of or similar open and closed loop control systems. The overall control could be easier than that used to maintain a fluidized bed. The density of the carbon particles (the bed voidage) in the fluidized bed could be adjusted to selectively control electromagnetic power heating. Using particles that have low density, mostly through particles with high porosity, would slow down the particles and will have increased residence time. Porosity control of the particles, including graphite, may be used to selectively control the pyrolysis and minimize the energy input. By introducing the particles at the top of the reactor, the upward flowing hot hydrogen can preheat the downward flowing particles. Similarly, at the bottom of the reactor, the hot downward flowing particles can preheat the upward flowing hydrocarbon feed (e.g., natural gas), achieving high energy regeneration. Larger, heavier particles, if the carbon is deposited in the particles, result in faster fall of these particles in the fluidized bed, while the lighter particles, will be slowed down more by the upward directed drag of the flowing gases (e.g., hydrocarbon feed).

The third block 530 of heating the bed of particles to a cracking temperature of the hydrocarbon feed via at least inductive heating or plasma heating may include heating the bed of particles to a temperature in the range of 800° C. to 2,500° C., such as 800° C. to 1,400° C., 1,100° C. to 1,600° C., 1,500° C. to 2,000° C., 2,000° C. to 2,500° C., at least 1,000° C., at least 1,200° C., at least 1,500° C., or less than 2,500° C. It should be understood that the cracking temperature refers to the pyrolysis temperature for a selected hydrocarbon (e.g., methane, ethane, or the like), in the presence of carbon or graphite particles. While a minimum pyrolysis temperature may be utilized, high temperatures may provide higher conversion of hydrocarbon feedstock to hydrogen gas and carbon products than the minimum pyrolysis temperature.

In some examples, heating the bed of particles to a cracking temperature of the hydrocarbon feed via at least inductive heating or plasma heating may include heating the bed of particles to more than one temperature, such as in discrete regions therein. Such multiple temperatures may include any of the temperatures disclosed above in discrete regions within the reaction chamber. Such multiple temperatures may be produced by multiple sets of induction coils or additional heating inputs distributed vertically along the longitudinal axis of the reaction chamber. In some examples, the temperature may increase with vertical height within the reaction chamber. In some examples, the temperature may decrease with vertical height within the reaction chamber.

Heating the bed of particles to a cracking (e.g., pyrolysis) temperature of the hydrocarbon feed via at least inductive heating or plasma heating may include heating the bed of particles with one or more of combustion heating, plasma heating, microwave heating, or joule heating. For example, the one or more of combustion heating, plasma heating, microwave heating, or joule heating may heat the bed of particles to any of the temperatures disclosed herein. To decrease the carbon footprint of the systems and techniques disclosed herein, the method may include using renewable electricity to power components of the systems. The source of the electricity may be excess electricity from renewable energy (e.g., solar, wind, geothermal, hydro-electric, etc.) or off-grid dedicated electricity.

At various times, in place of or in addition to inductive heating or plasma heating, the fluidized bed can also be heated by using some of the generated hydrogen as a fuel for combustion heating. The combustion can occur outside of the reaction chamber (or fluidized bed therein), and the hot gases introduced into the reaction chamber. In such cases, the hot gases may include steam. Alternatively, or in combination with the external hydrogen combustion, hydrogen combustion inside the fluidized bed may be employed. When combustion is used, oxygen is the preferable oxidizer, although air is adequate if high hydrogen purity is not needed. Such combustion forms products such as water. Alternating heating and pyrolyzing periods in the reactor provides direct heating of the bed of particles by the combustion of hydrogen in the bed of particles. After the bed of particles has been heated (e.g., reheated) by the combustion, the combustion may be followed by a pyrolysis period that continues as long as the temperatures are above temperatures for pyrolysis of the hydrocarbon. The process may be repeated, with periods of heating through combustion followed by periods of cooling through pyrolysis.

A heat exchanger may be used with the reactor so that production of combustion and the streams of gas that is being pyrolyzed and the products of combustion do not mix. This approach will be limited by available materials for the heat exchanger. Accordingly, the method 500 may include preheating the hydrocarbon feed prior to providing the hydrocarbon feed into the reaction chamber, such as via the heat exchanger or circulation through or near the induction coils. For example, the method may include recovering thermal energy from the hydrogen product exiting reaction chamber, such as via the heat exchanger to heat another gas (e.g., preheat the hydrocarbon feed).

The inductive or microwave heating and the hydrogen combustion heating can be varied as a function of spatial position, especially along the vertical direction within the reactor. The variation in combustion heating can be accomplished by an array of inlets spaced appropriately in the vertical direction. Variations in inductive heating can be accomplished by use of one or more sets of inductive coils that are separately controlled or through appropriate location of the turns of the coils to provide the selected heating profile. The spatial control of the heating can be used to selectively control conversion of methane to hydrogen and heating efficiency. Thus, lower temperatures can be used initially in the conversion process, for conversion that requires the most power. This power could be delivered by a combination of hydrogen combustion, electromagnetic heating (e.g., induction, plasma, microwave), or a combination of the two. Accordingly, most of the processing can be performed at the lower temperatures, with relatively "low" quality heat. Because most of the endothermic reactions occur at the lower temperature, the power required to raise the hydrocarbon flows to high temperatures is decreased. Lower power can be used downstream for heating the products to higher temperature to increase the conversion, but with reduced overall power to accomplish the conversion. This higher temperature can be reached by using electromagnetic heating. Thus, the low temperature region can be heated by one type of heating (e.g., combustion), while the higher temperature can be reached by the use of a different type of heating (e.g., induction). Examples of low temperature heating include external heating through a heat exchanger, for example, with external combustion.

One of the advantages of the techniques disclosed here is the accurate controllability of the temperature. The temperature can be controlled by controlling one or more of the gas composition (including the introduction of combustion in the bed or hot gases from external combustion), the external combustion and heating through a heat exchanger, by the total flow rate, or by the input power into the heating system (inductive, plasma, microwave, joule). The temperature needed for control can be measured by using optical means (mostly in the infrared) or by the use of thermocouples that are placed in the flow within the reaction chamber. In the case of induction heating, coupling of the electromagnetic fields to the thermocouple can be minimized, with limited heating to the actual sensing element. In the case of microwaves, it is helpful to minimize the coupling to the microwave (as the thermocouple could work as an antenna). It could be achieved by proper orientation of the antennas, or by proper placing of the antennas at places near null of the electric fields. Alternatively, the thermocouple may be covered by a grounded, conducting sheath. Any of the systems disclosed herein may include one or more thermocouples within the reaction chamber thereof, at the feed inlet, or the outlet.

The method 500 may include selectively controlling the temperature of the bed of particles to obtain selected ratio of hydrogen that is produced to hydrocarbon feedstock introduced into the reaction chamber. A selected operating temperature may be determined and selected based on a tradeoff between conversion (e.g., the higher temperature, the higher conversion), the power utilization (e.g., specific power consumption, in terms of hydrogen throughput to power used), and the faster kinetics. Because of the substantial endothermic energy inputs for the pyrolytic conversion of methane to hydrogen (around 15% of the chemical energy in methane) and the reduced energy due to the non-use of carbon, it is desirable to use as little electrically based heating (inductive heating, plasma heating and/or microwave heating) as possible for a given amount of hydrogen production. To achieve this goal, these sources should be used in the most efficient way, direct hydrogen combustion heating can be employed; and energy recovery (e.g., heat exchanger(s)) may also be utilized.

Startup heating of the bed of particles (e.g., fluidized carbon bed) will be larger than at other times, but the larger amount of heating can be tolerated for a short period of time. For startup, it may be advantageous to use more than one means of electrical heating, such as any combination or all of the heating means disclosed herein. Stored hydrogen-rich gas or direct combustion of methane could also be used for startup heating.

The amount of heating provided by various heating sources can be controlled by a combination of open loop control and closed loop control. Closed loop control in real time can be used to vary various operating parameters to obtain the desired performance parameters. Operating parameters include temperature as function of vertical position and the amount of heating (both electrical heating and combustion heating). Performance parameters include the ratio of hydrogen output to methane input, and the ratio of electricity produced by the hydrogen fueled spark ignition engines to electricity used for powering the inductive heating. The open loop control can include choice of operating parameters for startup.

The fourth block 540 of flowing the hydrocarbon feed upward through the fluidized bed of particles to crack at least a portion of the hydrocarbon feed to produce hydrogen gas and solid carbon products may include flowing the hydrocarbon feed at a selected flow rate (e.g., volume/unit time). Flowing the hydrocarbon feed upward through the fluidized bed of particles to crack at least a portion of the hydrocarbon feed to produce hydrogen gas and solid carbon products may include flowing the hydrocarbon feed at rate selected to provide a selected amount of hydrogen product per hydrocarbon feed introduced into the reaction chamber or to provide a selected amount of hydrogen product per amount of electrical power input into the heating system(s).

Flowing the hydrocarbon feed upward through the fluidized bed of particles to crack at least a portion of the hydrocarbon feed to produce hydrogen gas and solid carbon products may include may include flowing the hydrocarbon feed through a distributor plate disposed in a bottom region of the reaction chamber or a plurality of feed inputs (e.g., tubes) in the bottom region of the reaction chamber.

The pyrolysis of methane results in increased number of gaseous moles in the system, increasing the volumetric throughput and thus the speed of the gas. Increasing temperature also increases the velocity of the flow, making the fluidization conditions more difficult to control. Once at temperature, pyrolysis reactions are quick. Conversion is determined by both limited conversion (temperature or residence time) or by bypass (e.g., fractions that have shortened residence times or lower temperatures, or both).

There is a limited pressure drop across the fluidized bed. It is possible to operate the fluidized bed at pressures higher than atmospheric, reducing the physical size of the equipment (or increasing the flow rate). At the higher pressure, input power for heating should be increased, as there is large mass throughput. Another advantage of the high pressure is that the kinetics of methane pyrolysis are faster. However, the equilibrium carbon is lower at the higher pressures, but can be compensated by slightly increased temperatures. Temperatures around 1,200° C. result in over 90% methane conversion. Accordingly, the systems and techniques for pyrolyzing hydrocarbon feedstock disclosed herein can be operated at pressures above atmospheric to provide relatively high conversion rates.

The pyrolysis of hydrocarbon feedstock disclosed herein results in hydrogen and carbon. The carbon deposits on the surfaces of the particles in the fluidized bed. In the case of carbon particles, the size of the carbon particles increases, with a corresponding increase in mass. The heavy particles lose buoyancy and lift, and move down in the fluidized bed. They can be collected at the bottom once they are heavy enough. The particles can be reused by processing including breaking. The particles can be introduced at the top or at the bottom of the bed, once fluidized. At least some of the carbon may be formed in the rising gas and will not attach to the carbon or graphite particles.

The method 500 may include collecting the hydrogen gas product and carbon solid product. The method 500 may include separating the hydrogen gas from the carbon produced via pyrolysis of the hydrocarbon feed. The hydrogen that is produced by the high temperature pyrolytic processes disclosed herein is readily separated from small carbon particles that are produced as a result of nucleation that is produced in the region above the fluidized bed. The carbon that is produced and collected can be much more easily sequestered than $CO_2$ and/or can be used for commercial purposes. The carbon solids can be removed by the use of a cyclone, by electrostatic precipitation, or by the use of a filter, such as a "candle" filter with ceramic material, a metallic filter with pores, or a fabric filter (e.g., a bag house). The carbon produced may be valuable, depending on its physical and chemical properties, as carbon black, carbon nanotubes, or other carbon products. If not, the carbon can be disposed of, such as in exhausted coal mines, in a "reverse mining" process.

In addition to temperature diagnostics, the systems and techniques disclosed herein may include determination of local loading (to determine ratio of gas to solids) and/or velocimetry (particle speed). Density of particles, or bed voidage, could be measured by interferometric means, among others. Other indications include pressure drop, pressure fluctuations, and exhaust composition.

The method 500 may include utilizing at least some of the hydrogen gas product to provide one or more of combustion heating for heating the bed of particles, preheating the hydrocarbon feed, or power production to produce electricity to operate one or more electromagnetic heating sources (e.g., induction coils) for heating the bed of particles. These uses of the hydrogen product gas may be varied as a function of the amount of externally supplied electricity that is employed. For example, when low cost surplus renewable electricity is employed, less of the hydrogen gas product would be used to operate one or more of the electromagnetic wave heating sources. The throughput of gas through the fluidized bed can be maintained or altered by adding product hydrogen into the reaction chamber 111. Accordingly, the methods and systems disclosed herein can maintain or vary throughput to accommodate changes in available electricity for powering the systems or changes in available feedstock supply volume for flowing through the fluidized bed.

The hydrogen that is produced from the process may contain small amounts of low weight hydrocarbon including methane and depending on the source of natural gas, could also contain sulfur compounds and CO (if there is any $CO_2$ in the natural gas). This hydrogen rich gas produced by the process can be used to provide very low carbon electricity by using it as a fuel in one or more a spark ignition engines, if the carbon produced is sequestered. A spark ignition engine is much more tolerant of impurities in the hydrogen stream than a fuel cell.

Some of the electricity that is produced by the electricity generators (e.g., engines, turbines of fuel cells) can be used for the electromagnetic heating and the rest can be used as an electricity source for the grid or for a decentralized supply of electricity for commercial or industrial use. One of the uses of this electricity may be balancing grid electricity supply and demand when wind, solar or other variable renewable sources of electricity are used. This can be especially important when there are long periods of reduced renewable electricity due to weather of seasonal effects on these electricity sources.

The hydrocarbon feedstock that can be processed in the heated fluidized bed as disclosed herein may include natural gas from pipelines, methane containing gases from landfills and digesters used for bio waste, exhaust gases from various industrial process, or the like. Such hydrocarbon feedstock also includes natural gas that would otherwise be flared at oil and gas wells. In such examples, the elemental carbon that is produced via the systems and techniques disclosed herein could be disposed of at or near the well sites that provide the flare gas.

As used herein, the term "about" or "substantially" refers to an allowable variance of the term modified by "about" by ±10% or ±5%. Further, the terms "less than," "or less," "greater than", "more than," or "or more" include as an endpoint, the value that is modified by the terms "less than," "or less," "greater than," "more than," or "or more."

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A system for cracking hydrocarbons into hydrogen gas and carbon, the system comprising:
  a reactor having a reaction chamber therein;
  a bed of particles disposed in the reaction chamber, the bed of particles including one or more of electrically conductive carbon, graphite, or other particles; and
  an induction unit surrounding the bed of particles, the induction unit having induction coils for producing heat in the bed of particles; and
  one or more plasma arc electrodes in the reactor for providing an electric arc within the bed of particles.

2. The system of claim 1 wherein the reactor includes an updraft reactor and the bed of particles includes a fluidized bed.

3. The system of claim 1 wherein the reactor includes a feed inlet at a bottom of the reaction chamber.

4. The system of claim 1 wherein the particles consist essentially of carbon particles.

5. The system of claim 1 wherein a lateral dimension of the reaction chamber where the fluidized bed is disposed varies as a function of height above a bottom of the reaction chamber.

6. The system of claim 1, further comprising one or more microwave heaters for providing microwave heating to the bed of particles.

7. The system of claim 1, further comprising a recuperator fluidly coupled to an output of the reactor and configured to recover thermal energy from products of the reactor.

8. The system of claim 1, further comprising a recuperator operably coupled to the feed inlet and configured to preheat a hydrocarbon feedstock circulated therethrough.

9. The system of claim 1, wherein the one or more plasma arc electrodes include at least two electrodes in electrical contact with the bed of particles, wherein the at least two electrodes are spaced from each other such that when connected to a power supply, electric current passes from one electrode to at least the second electrode to produce heat.

10. The system of claim 1, wherein:

the reactor includes one or more of at least one joule heating electrode or at least one microwave heater; and the reactor is configured to selectively heat the bed of particles via a combination of at least two of induction heating, plasma heating, microwave heating, or joule heating.

11. The system of claim 1, further comprising:

a feed inlet at a bottom of the reaction chamber; and a feed conduit in fluid communication with a feed source and the feed inlet, the feed conduit being disposed at least partially within a wall of the reactor to pre-heat the hydrocarbon feedstock.

12. The system of claim 11, wherein the induction coils are hollow and are configured as the feed conduit.

13. The system of claim 1, wherein the bed of particles includes at least one of electrically conductive particles including one or more of carbon particles, graphite particles, carbon pellets, graphite pellets, graphite rods, carbon powder, graphite powder, magnetic particles, porous carbon particles, carbon coated particles, carbon coated metals, or carbon black.

14. The system of claim 1, wherein the bed of particles includes catalytic particles.

15. The system of claim 1, wherein the bed of particles is free of metal catalyst material.

16. The system of claim 1, wherein:

the induction coils include a first induction coil and a second induction coil vertically spaced from the first induction coil; and the first induction coils and the second induction coils are configured to independently heat the reaction chamber to provide at least two zones having different temperatures therein.

17. A system for cracking hydrocarbons into hydrogen gas and carbon, the system comprising:

a reactor having a rection chamber therein;

a bed of particles disposed in the reaction chamber, the bed of particles including one or more of electrically conductive carbon, graphite, or other particles; and at least two electrodes in electrical contact with the bed of particles, wherein the at least two electrodes are spaced from each other such that when connected to a power supply, electric current passes from one electrode to at least the second electrode to produce heat.

\* \* \* \* \*